July 16, 1929. A. Y. DODGE Re. 17,373

BRAKE

Original Filed May 22, 1926

INVENTOR
ADIEL Y. DODGE
BY
Jno. W. McCarter
ATTORNEY

Reissued July 16, 1929.

Re. 17,373

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE.

Original No. 1,664,197, dated March 27, 1928, Serial No. 110,854, filed May 22, 1926. Application for reissue filed January 24, 1929. Serial No. 334,815.

This invention relates to the construction and arrangement of brake shoes, and is illustrated as embodied in an internal expanding automobile brake of the three-shoe type.

While channel-shaped brake shoes, and other brake shoes having stiffening webs at opposite sides of the friction face, have certain advantages, for example being very rigid, it has not heretofore been feasible to make them of steel stampings, thus minimizing the cost, because of the difficulty of forming the friction face on a truly cylindrical arc. Since this is principally due to the fact that in previous designs the friction face bottoms in the die and has a variable "spring" when the die is released, an important object of the present invention is to provide a shoe of this general character in such a manner that the cylindrical friction face may be drawn out along the side of the die, thus permitting great accuracy.

In one desirable arrangement, the shoe comprises two parts, such as the above-discussed stampings, each having a cylindrical flange and a stiffening portion or web, arranged with the stiffening portions extending inwardly at opposite sides of the friction face of the shoe and with the cylindrical flanges preferably edge to edge and forming the friction face. The brake lining may be secured to the two cylindrical flanges, bridging the joint between them, and preferably novel pivot members at the ends of the shoe aid the lining in securing the two parts together. The edge-to-edge flanges may or may not be welded or otherwise secured together.

Another feature of the invention relates to utilizing a shoe of this type in a brake having overlapping shoes, one or both of the end shoes projecting between the half-shoes formed by the separate parts described above.

The above and other objects and features of the invention, including various novel combinations of parts and desirable particular constructions, will be apparent from the following description of one illustrative embodiment shown in the accompanying drawing, in which.

Figure 1:
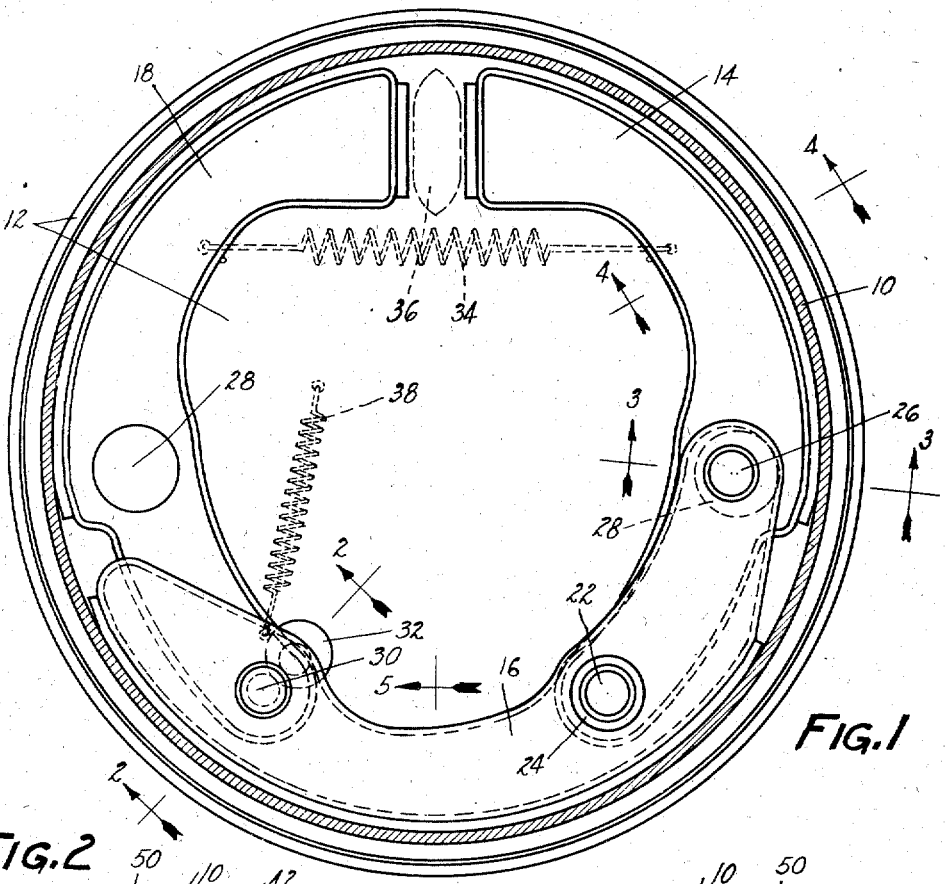
Figure 1 is a vertical section through the brake just inside the head of the drum, showing the shoes in side elevation and in "on" position, but with the cam in "off" position.
Figure 2:
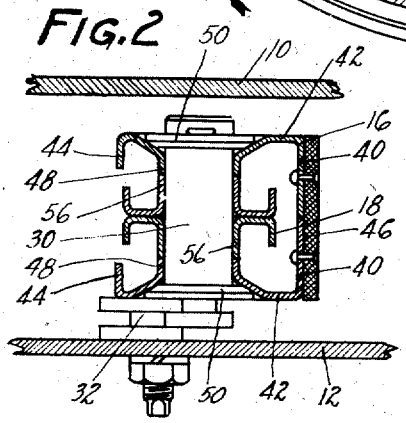
Figure 2 is a partial radial section on the line 2—2 of Figure 1, showing the pivotal connection between two of the shoes.
Figure 3:
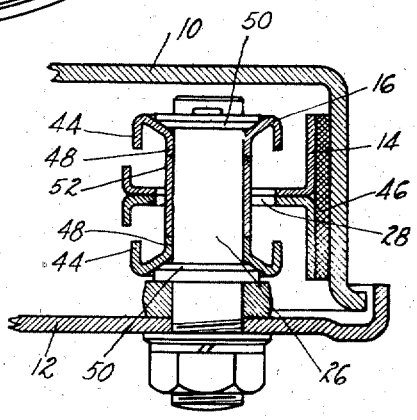
Figure 3 is a partial radial section on the line 3—3 of Figure 1, showing the anchorage of the central shoe.

The illustrated brake includes a drum 10, at the open side of which there may be a backing plate 12, and within which are arranged a plurality of shoes 14, 16, and 18, shoes 14 and 18 preferably being interchangeable. Shoe 14 is anchored on a pivot member 22 passing through a relatively large opening 24 in shoe 16, while shoe 16 is anchored on a pivot member 26 passing through a relatively large opening 28 in shoe 14, the shoes thus in effect overlapping each other. Shoes 16 and 18 are connected by a pivot member 30 having a grooved head interlocked with an eccentric adjustable stop 32.

Shoes 14 and 18 are forced apart, to apply the brake, against the resistance of a return spring 34, by means such as a double cam 36, whereupon shoe 18 forces shoe 16 toward the drum against the resistance of an auxiliary return spring 38.

An important feature of the invention relates to the construction of the central shoe 16. This shoe, in its preferred form, comprises two separate parts, preferably angular-section steel stampings, each having a cylindrical flange 40 and a stiffening portion or web 42, the two stiffening portions 42 extending inwardly at the opposite sides of the friction face of the shoe and the two flanges 40 preferably being arranged edge to edge to form the friction face, the two separate parts being in effect two half-shoes straddling at their ends the ends of shoes 14 and 18. I prefer to provide also narrower inner flanges 44, projecting toward each other in the finished shoe, thus giving the whole shoe an attractive appearance and a very strong box section.

While in some brakes it may be desirable to weld the edges of flanges 40 together, ordinarily I prefer to connect the two parts of the shoe only by the lining 46, riveted or otherwise secured to both flanges and bridging across the joint between them and by the pivot members 26 and 30. The stiffening portions 42 may be drawn out to form inwardly-tapering bearing portions 48 sleeved on the pivot members and receiving conical parts 50 integral with or carried by those pivot members. A special spacer 52 may be sleeved on pivot member 26 between the bearing portions 50. The flanges 40 may be reduced in width at the anchored end of shoe 16, to clear shoe 14, so that the stiffening portions 42 in effect form at that end of the shoe a pair of spaced anchoring arms offset within the curve of the shoe to clear the end of the friction face of shoe 14.

Figure 4:
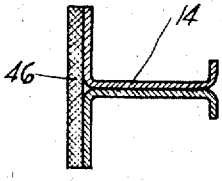
Figure 4 is a section through one of the two interchangeable end shoes, on the line 4—4 of Figure 1.
Figure 5:
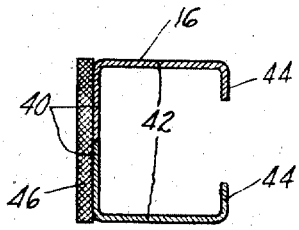
Figure 5 is a section through the central shoe, on the line 5—5 of Figure 1.

The end shoes 14 and 18, which are interchangeable, are formed by riveting or otherwise securing back to back two L-section stampings (see Figure 4) to form shoes of T section. At their pivoted ends, the central stiffening web formed of the two radial flanges is offset within the curve of the shoes to clear the adjacent end of the friction face of shoe 16 and projects beyond the end of the shoe between the two webs or portions 42 of shoe 16. These central flanges may be drawn out to form tubular bearing bosses 56 sleeved on pivot 30 and forming a spacer between the two bearing portions 48 of shoe 16.

While one illustrative embodiment has been described in detail, it is not my intention to limit the scope of the invention to that particular embodiment, or otherwise than by the terms of the appended claims.

I claim:

1. A brake shoe comprising, in combination, two parts, each of said parts having a cylindrical flange and a stiffening web integral with each other, the two parts being arranged face toward each other with the stiffening webs extending inwardly on opposite sides of the friction face of the shoe and with the cylindrical flanges co-operating to provide the friction face of the shoe.

2. A brake shoe comprising, in combination, two pressed-metal parts, each of said parts having a cylindrical flange and a stiffening portion integral with each other, the two parts being arranged to face toward each other with the stiffening portions extending inwardly at the extreme opposite sides of the shoe and together with the cylindrical flanges forming a channel-shaped shoe.

3. A brake shoe comprising, in combination, two parts, each of said parts having a cylindrical flange and a stiffening portion integral with each other, the two parts being arranged side by side with the stiffening portions extending inwardly at opposite sides of the friction face of the shoe and with the cylindrical flanges edge to edge to form the friction face of the shoe, together with brake lining secured across both of the cylindrical flanges and bridging the joint between them.

4. A brake shoe comprising, in combination, two parts, each of said parts having a cylindrical flange and a stiffening portion integral with each other, the two parts being arranged side by side with the stiffening portions extending inwardly at opposite sides of the friction face of the shoe and with the cylindrical flanges edge to edge to form the friction face of the shoe, together with a pivot member at each end of the shoe holding said parts together.

5. A brake shoe comprising, in combination, two parts, each of said parts having a cylindrical flange and a stiffening portion integral with each other, the two parts being arranged side by side with the stiffening portions extending inwardly at opposite sides of the friction face of the shoe and with the cylindrical flanges edge to edge to form the friction face of the shoe, together with a pivot member holding said parts together.

6. A brake shoe comprising two separately formed parts, each of said parts having a cylindrical flange and a stiffening portion integral with each other, the two parts being arranged with the stiffening portions extending inwardly at opposite sides of the friction face of the shoe and with the cylindrical flanges edge to edge, the cylindrical flanges being reduced at one end of the shoe so that the stiffening portions at that end form a pair of spaced projecting arms.

7. A brake shoe comprising two separately formed parts, each of said parts having a cylindrical flange and a stiffening portion integral with each other, the two parts being arranged with the stiffening portions extending inwardly at opposite sides of the friction face of the shoe and with the cylindrical flanges edge to edge, the cylindrical flanges being reduced at one end of the shoe so that the stiffening portions at that end form a pair of spaced projecting arms, said arms having inwardly-tapering bearing portions in alinement with each other, a pivot member projecting through the bearing portions, and conical parts on the pivot member seated in the tapered bearing portions.

8. A brake shoe comprising two separately formed parts, each of said parts having a cylindrical flange and a stiffening portion integral with each other, the two parts being arranged with the stiffening portions extending inwardly at opposite sides of the friction face of the shoe and with the cylindrical flanges edge to edge, the stiffening portions having alined inwardly-tapering bearing portions, a pivot member projecting through the bearing portions, and conical parts on the pivot member seated in the tapered bearing portions.

9. A brake shoe comprising two separately-formed parts, each of said parts having a cylindrical flange and a stiffening portion integral with each other, the two parts being arranged with the stiffening portions extending inwardly at opposite sides of the friction face of the shoe and with the cylindrical flanges edge to edge, the stiffening portions having alined bearing portions, a pivot member projecting through the bearing portions, and a spacer on the pivot member confined between said bearing portions.

10. A box-section brake shoe formed of two parts, each having an outer wide cylindrical flange and a narrow innner flange connected by a web, said parts being arranged with the webs at opposite sides of the shoe and with the outer flanges meeting edge to edge and with the inner flanges projecting toward each other.

11. A brake shoe formed of two connected parts having cylindrical flanges with free edges throughout their length, said free edges engaging each other, and a brake lining secured to both of said parts and bridging across them.

12. A brake shoe comprising two parts extending longitudinally beside each other throughout the length of the shoe and capable of unresisted slight outward movements independently of each other, and a common pivot member for said parts.

13. A channel-shaped arcuate brake shoe formed of pressed sheet metal and having relatively short reinforcing flanges extending toward each other from the inner edges of its opposite sides.

14. A brake comprising, in combination, a central shoe formed of a pair of longitudinally-extending half-shoes arranged side by side and capable of slight outward movements independently of each other, and a pair of end shoes projecting between opposite ends of said half-shoes.

15. A brake comprising, in combination, a shoe formed of a pair of longitudinally-extending half-shoes arranged side by side and capable of slight outward movements independently of each other, and an end shoe projecting between the ends of said half-shoes.

16. A brake comprising, in combination, a plurality of shoes, one formed of two angular-section stampings arranged edge to edge, and another formed of two angular-section stampings arranged back to back and projecting at one end between the stampings of the other shoe.

17. A brake shoe including separately-formed stampings having cylindrical flanges secured together edge to edge in a joint running lengthwise of the shoe, to form the friction face of the shoe.

In testimony whereof, I have hereunto signed my name.

ADIEL Y. DODGE.